(12) United States Patent
Jayasena

(10) Patent No.: US 11,899,642 B2
(45) Date of Patent: Feb. 13, 2024

(54) SYSTEM AND METHOD USING HASH TABLE WITH A SET OF FREQUENTLY-ACCESSED BUCKETS AND A SET OF LESS FREQUENTLY-ACCESSED BUCKETS

(71) Applicant: Advanced Micro Devices, Inc., Santa Clara, CA (US)

(72) Inventor: Nuwan Jayasena, Sunnyvale, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 54 days.

(21) Appl. No.: 16/717,027

(22) Filed: Dec. 17, 2019

(65) Prior Publication Data

US 2021/0182262 A1 Jun. 17, 2021

(51) Int. Cl.
  *G06F 7/00* (2006.01)
  *G06F 16/22* (2019.01)
  *G06F 16/31* (2019.01)

(52) U.S. Cl.
  CPC ........ *G06F 16/2255* (2019.01); *G06F 16/328* (2019.01)

(58) Field of Classification Search
  CPC ............... G06F 16/2255; G06F 16/328; G06F 16/9014; G06F 16/254; G06F 16/219
  USPC ................ 707/698, 736, 747, 722, 737, 758
  See application file for complete search history.

(56) References Cited

U.S. PATENT DOCUMENTS

| | | | |
|---|---|---|---|
| 5,542,089 A | 7/1996 | Lindsay et al. | |
| 10,474,588 B1* | 11/2019 | Ugale | G06F 3/0685 |
| 2006/0265370 A1* | 11/2006 | Qian | G06F 16/9014 |
| 2016/0182373 A1* | 6/2016 | Wang | H04L 69/22 |
| | | | 370/392 |
| 2017/0300592 A1 | 10/2017 | Breslow et al. | |
| 2019/0266252 A1* | 8/2019 | Breslow | G06F 16/2255 |

FOREIGN PATENT DOCUMENTS

WO 2013/126665 A1 8/2013

OTHER PUBLICATIONS

Counting Bloom filter; Wikipedia; https://en.wikipedia.org/wiki/Bloom_filter; Jul. 29, 2019.
Bloom Filter; Wikipedia; https://en.wikipedia.org/wiki/Counting_Bloom_filter; Oct. 18, 2019.

(Continued)

*Primary Examiner* — Md I Uddin

(57) ABSTRACT

A method and apparatus perform a first hash operation on a first key wherein the first hash operation is biased to map the first key and associated value to a set of frequently-accessed buckets in a hash table. An entry for the first key and associated value is stored in the set of frequently-accessed buckets. A second hash operation is performed on a second key wherein the second hash operation is biased to map the second key and associated value to a set of less frequently-accessed buckets in the hash table. An entry for the second key and associated value is stored in the set of less frequently-accessed buckets. The method and apparatus perform a hash table look up of the requested key in the set of frequently-accessed buckets, if the requested key is not found, then a hash table lookup is performed in the set of less frequently-accessed buckets.

14 Claims, 7 Drawing Sheets

(56) References Cited

OTHER PUBLICATIONS

Charikar, Moses et al.; Finding Frequent Items in Data Streams; Theoretical Computer Science; vol. 312, No. 1; Jan. 26, 2004.
Karp, Richard M. et al.; A Simple Algorithm for Finding Frequent Elements in Streams and Bags; ACM Transactions on Database Systems; vol. 28, No. 1; Mar. 2003.
European Patent Office; International Search Report and Written Opinion; International Application No. PCT/US2020/065468; dated Apr. 7, 2021.

* cited by examiner

FIG. 4

SYSTEM AND METHOD USING HASH TABLE WITH A SET OF FREQUENTLY-ACCESSED BUCKETS AND A SET OF LESS FREQUENTLY-ACCESSED BUCKETS

BACKGROUND OF THE DISCLOSURE

Hash tables are data structures that implement associative arrays. With some hash tables, one or more hash functions are used to map a given "key" to one or more indices, which identify bucket(s) within the hash table that may hold the "value" (or a pointer to the value) associated with the key. Typically, a bucket contains multiple "slots", each of which can hold a single key-value pair. Slots within a bucket are fully associative, in that any slot in a bucket can hold any item that maps to that bucket. Hash tables are widely used across many application domains. An ideal hash table tries to uniformly distribute its contents across all of its buckets. Software libraries that are called by applications for example, employ core primitives such as hash tables that provide wide applicability across a broad range of application domains including relational databases, key-value stores, machine learning applications and other uses.

However, uniformly distributing contents across all buckets can cause poor cache performance in the case of very large hash tables even if the data itself has temporal locality as each bucket typically ends up with a mix of frequently-accessed (FA) and infrequently-accessed (IA) data. For example, hardware caches are designed to try to capture frequently-accessed data. However, by design (i.e., uniform distribution and placement of items in buckets), hash tables mix frequently-accessed items with infrequently-accessed items in the same cache lines, hindering the ability of caches to capture a hot working set.

Some conventional high-performance hash tables typically use multiple mapping hash functions (most often two) to map a given key to multiple candidate buckets in the hash table. A simplified example is shown in FIG. 1. Commonly when inserting a new data item 10 into the hash table 12, output of the hash functions 14 and 16 are computed in parallel and then the item is inserted into the candidate bucket with the most unoccupied slots. In the example hash table with eight buckets and four slots per bucket, the occupied slots are shown in gray and empty slots are shown in white. As shown, new item (K,V) with key K and value V is being inserted using two hash functions F1 ( ) and F2 ( ) for identified candidate buckets 5 and 0. If the insertion policy is to insert into the least-loaded candidate bucket, (K, V) will be inserted into bucket 5 in this example. This helps keep the loading across different buckets of the hash table more even, allowing uniform loading even at high load factors. Alternatively, the hash functions may be evaluated serially, and the item inserted into the first candidate bucket encountered that has space available. If all the candidate buckets are full, evictions are used (such as cuckoo evictions) where one of the existing items are evicted to make space for the new data item. The evicted item is then reinserted into one of its alternate candidate buckets. If all the candidate buckets are also full, the chain of evictions continue until the eviction terminates, such as when the last evicted item is able to fit in one of its candidate buckets.

During a lookup operation, the mapping hash functions are applied to the key being looked up to locate the candidate buckets. Then, each of the slots in the candidate buckets are searched, comparing the key of interest to the keys in each of the slots of the candidate buckets. The search across all slots is needed as slots within a bucket are fully associative (i.e., the mapping hash functions only identify buckets, not specific slots within the bucket). Because hash tables typically attempt to uniformly distribute data elements across buckets, large hash tables have poor cache performance. For example, even if a high percentage of the accesses to the data set target a small fraction of the data items, they are distributed across the entire hash table. Further, hash buckets are typically sized such that multiple slots of a bucket fit within a single cache line. Therefore, fetching a single frequently-used item into a cache likely also fetches multiple infrequently-used items that are part of the same bucket, reducing the ability of the cache to capture a useful set of frequently-accessed items.

Therefore, it would be highly advantageous to have an improved hash table operation for caches or for other uses.

BRIEF DESCRIPTION OF THE DRAWINGS

The implementations will be more readily understood in view of the following description when accompanied by the below figures, wherein like reference numerals represent like elements, and wherein:

FIG. 4 is a diagram illustrating one example of a hash table that employs differing sets of buckets separated by frequently-accessed buckets and less frequently-accessed buckets in accordance with one example set forth in the disclosure;

DETAILED DESCRIPTION OF IMPLEMENTATIONS

Figure 1:
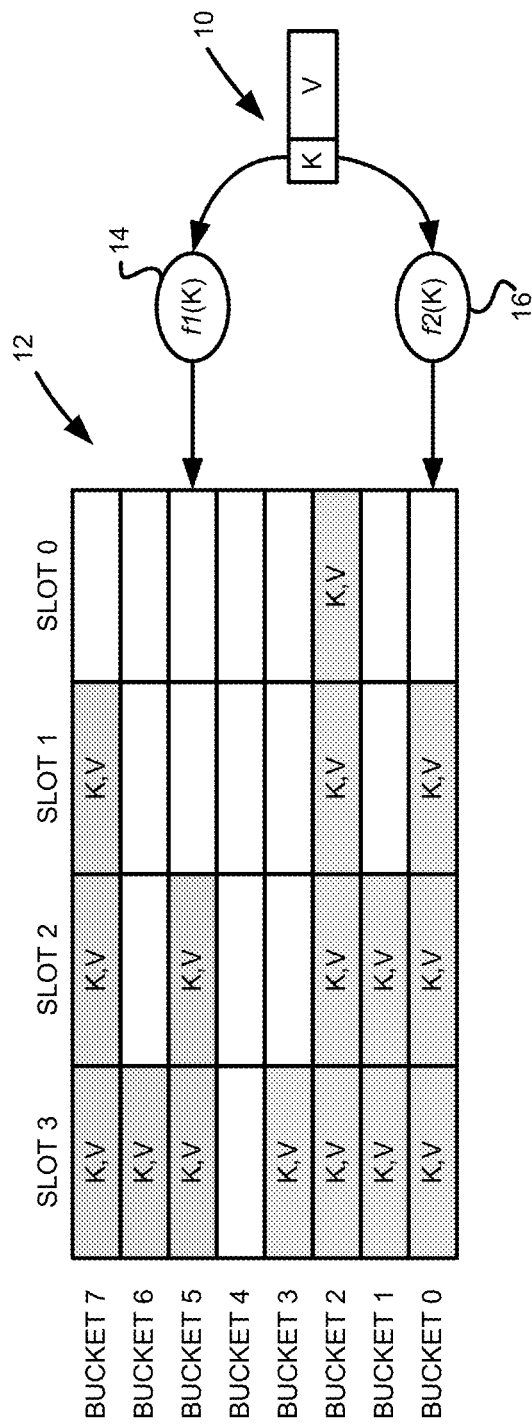
FIG. 1 is a prior art block diagram illustrating one example of a hash table that uses multiple hash functions to determine a suitable bucket for inserting a hash table entry.

Briefly, systems and methods partition buckets of a hash table into two disjoint sets, frequently-accessed buckets and less frequently-accessed buckets. The terms "less frequently" and "infrequently" are used interchangeably herein. In some implementations, a number of buckets in the frequently-accessed set is chosen such that the frequently-accessed buckets are likely to fit in hardware caches. In some implementations, a subset of mapping hash functions which can be referred to as frequently-accessed (FA) mapping functions, are biased to map primarily to the frequently-accessed set of buckets in the hash table and the remaining hash functions are a subset of mapping hash functions which are biased to map primarily to the less frequently-accessed set of buckets in the hash table. In some implementations, tracking data is maintained to identify which data items are frequently-accessed and which are not. Based on the tracking data, frequently-accessed elements are identified and moved to the frequently-accessed buckets of the hash table while infrequently-accessed data items remain in the less frequently-accessed buckets.

According to certain implementations, a method, carried out by one or more processors performs a first hash operation on a first key wherein the first hash operation is biased to map the first key and associated value to a first candidate bucket within a first set of buckets of a hash table serving as a set of frequently-accessed buckets. The method includes storing an entry for the first key and associated value in the first candidate bucket within the first set of buckets of the hash table, such as in a cache memory sized to fit the set of frequently-accessed set of buckets. The method also includes performing a second hash operation on a second key wherein the second hash operation is biased to map the second key and associated value to a second candidate bucket within a second set of buckets of the hash table serving as a set of less frequently-accessed buckets and storing an entry for the second key and associated value in the second candidate bucket within the second set of buckets of the hash table. In response to a lookup request for a key, the method includes performing a hash table look up of the requested key in the first set of frequently-accessed buckets, if the requested key is not found, then the method includes performing a hash table lookup of the requested key in the set of less frequently-accessed buckets. In other implementations, the method includes performing the lookup using both hash functions and both sets of buckets in parallel.

In some examples, the method includes biasing the first and second hash operations so that the first hash operation exclusively maps the first key and associated value to a first set of buckets of the hash table serving as the set of frequently-accessed buckets and so that the second hash operation exclusively maps the second key and associated value to the second set of buckets of the hash table serving as the set of less frequently-accessed buckets.

In certain examples, a default priority is given to store entries in the less frequently-accessed buckets. In some embodiments, all key-value pairs are first inserted into the less frequently-accessed set of buckets and then, if it turns out the value is accessed frequently, then it is moved to the frequently-accessed bucket set. In some examples, the method includes evicting hash table entries when the second set of buckets of the hash table serving as the less frequently-accessed buckets is full and then storing the entry for the hashed second key in the second set of buckets. The evicted entries may be chosen based on their access frequency such that the more frequently-accessed entries are evicted from the second set of buckets serving as the less frequently-accessed buckets and are moved to the first set of buckets serving as the frequently-accessed buckets.

In certain examples, the method includes producing tracking data that represents a number of times each slot in a bucket within the first set of frequently-accessed buckets of the hash table and the second set of less frequently-accessed buckets of the hash table have been accessed. In some examples the method includes moving an entry from the second set of less frequently-accessed buckets to the first set of frequently-accessed buckets or vice versa based on the tracking data.

In some examples, the method includes performing the first and second hash operations on a weighted basis in response to table entry requests. In certain examples, the method includes storing and using per bucket fullness data to determine whether to move hash table entries between the first and second set of buckets of the hash table.

According to certain implementations, a computing device includes a hash table logic that performs a first hash operation on a first key wherein the first hash operation is biased to map the first key and associated value to a first candidate bucket within a first set of buckets of a hash table serving as a set of frequently-accessed buckets and store an entry for the first key and associated value in the first candidate bucket within the first set of buckets of the hash table. In some implementations, the hash table logic performs a second hash operation on a second key wherein the second hash operation is biased to map the second key and associated value to a second candidate bucket within a second set of buckets of the hash table serving as a set of less frequently-accessed buckets and stores an entry for the second key and associated value in the second candidate bucket within the second set of buckets of the hash table. In response to a lookup request for a key, in certain implementations, the hash table logic performs a hash table look up of the requested key in the first set of frequently-accessed buckets, if the requested key is not found, then performs a hash table lookup of the requested key in the less frequently-accessed bucket set. In other implementations, lookups are performed by using both hash functions and both sets of buckets in parallel.

In certain examples, the computing device biases the first and second hash operations so that the first hash operation exclusively maps the first key and associated value to a first set of buckets of the hash table serving as the set of frequently-accessed buckets and so that the second hash operation exclusively maps the second key and associated value to the second set of buckets of the hash table serving as the set of less frequently-accessed buckets.

In certain examples, the hash table logic evicts hash table entries when the second set of buckets of the hash table serving as the less frequently-accessed buckets is full and then stores the entry for the hashed second key in the second set of buckets. The evicted entries may be chosen based on their access frequency such that the more frequently-accessed entries are evicted from the second set of buckets serving as the less frequently-accessed buckets and are moved to the first set of buckets serving as the frequently-accessed buckets.

In some examples, the hash table logic further includes a slot access counter structure that produces tracking data that represents a number of times each slot in a bucket within the first set of frequently-accessed buckets of the hash table and the second set of less frequently-accessed buckets of the hash table have been accessed. In certain implementations, the hash table logic moves an entry from the second set of less frequently-accessed buckets to the first set of frequently-accessed buckets and vice versa based on the tracking data.

In certain examples, the hash table logic performs the first and second hash operations on a weighted basis in response to table entry requests. In some examples, the hash table logic stores and uses per bucket fullness data to determine whether to move hash table entries between the first and second set of buckets of the hash table. In certain examples, the computing device includes memory including the hash table and includes one or more processors that operate as the hash table logic.

According to some implementations, a non-transitory storage medium includes executable instructions that when executed by one or more processors, causes the one or more processors to perform a first hash operation on a first key wherein the first hash operation is biased to map the first key and associated value to a first candidate bucket within a first set of buckets of a hash table serving as a set of frequently-accessed buckets, store an entry for the first key and associated value in the first candidate bucket within the first set of buckets of the hash table, perform a second hash operation on a second key wherein the second hash operation is biased to map the second key and associated value to a second candidate bucket within a second set of buckets of the hash table serving as a set of less frequently-accessed buckets, store an entry for the second key and associated value in the second candidate bucket within the second set of buckets of the hash table and in response to a lookup request for a key, perform a hash table look up of the requested key in the first set of frequently-accessed buckets, if the requested key is not found, then perform a hash table lookup of the requested key in the less frequently-accessed bucket set. In other implementations the lookup is done by using both has functions and both sets of buckets in parallel.

In certain examples, the non-transitory storage medium includes executable instructions that when executed by one or more processors, causes the one or more processors to bias the first and second hash operations so that the first hash operation exclusively maps the first key and associated value to a first set of buckets of the hash table serving as the set of frequently-accessed buckets and so that the second hash operation exclusively maps the second key and associated value to the second set of buckets of the hash table serving as the set of less frequently-accessed buckets.

In certain examples, the non-transitory storage medium includes executable instructions that when executed by one or more processors, causes the one or more processors to evict hash table entries when the second set of buckets of the hash table serving as the less frequently-accessed buckets is full and then storing the entry for the hashed second key in the second set of buckets. The evicted entries may be chosen based on their access frequency such that the more frequently-accessed entries are evicted from the second set of buckets serving as the less frequently-accessed buckets and are moved to the first set of buckets serving as the frequently-accessed buckets.

In some examples, the non-transitory storage medium includes executable instructions that when executed by one or more processors, causes the one or more processors to produce tracking data that represents a number of times each slot in a bucket within the first set of frequently-accessed buckets of the hash table and the second set of less frequently-accessed buckets of the hash table have been accessed and move an entry from the second set of less frequently-accessed buckets to the first set of frequently-accessed buckets or vice versa based on the tracking data.

Figure 2:
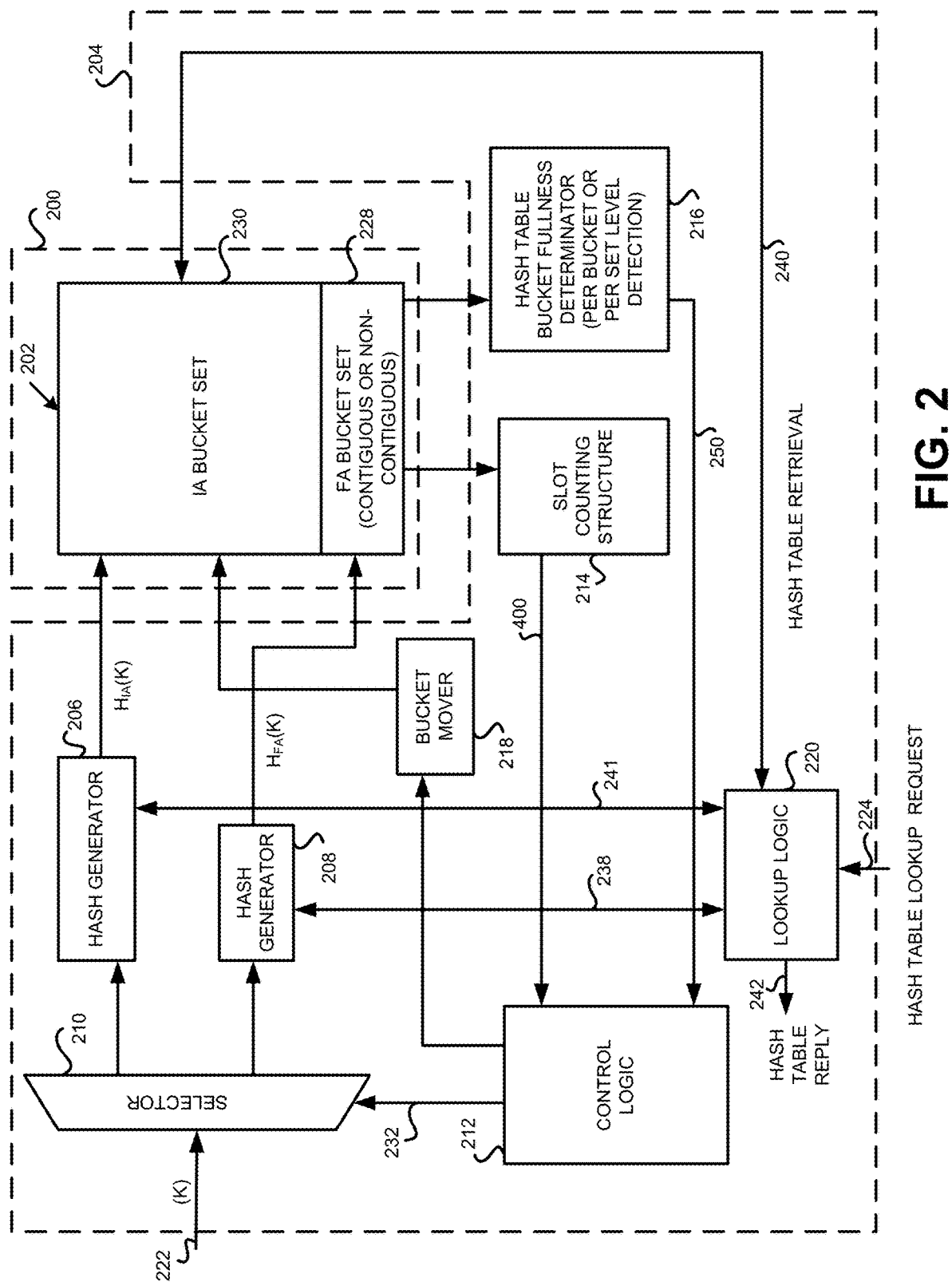
FIG. 2 is a block diagram illustrating one example of a portion of a computing system in accordance with an embodiment set forth in the disclosure.

FIG. 2 illustrates one example of a portion of a computing system such as a portion of a hardware server, smartphone, wearable, printer, laptop, desktop, or any other suitable computing device that employs the use of hash tables. In this example, the portion of the computing device includes memory 200 such as a cache and the main memory of a processor such as a central processing unit (CPU), graphics processing unit (GPU), accelerated processing unit (APU), application specific integrated circuit (ASIC), or other integrated circuit, that includes a hash table 202 and a hash table logic 204. The hash table logic 204 interfaces with the memory 200 to populate and organize the hash table 202.

The hash table logic 204, in one example, is implemented as a programmable processor that executes executable instructions that are stored in memory that when executed, cause the processor to operate as the hash table logic described herein. In other implementations, the hash table logic is implemented as discrete logic, one or more state machines, a field programmable gate array (FPGA) or any suitable combination of processors executing instructions and other hardware. In this example, the hash table logic 204 includes a plurality of hash generators 206 and 208, a selector 210, control logic 212, slot counting structure 214, hash table bucket fullness determinator 216, bucket mover 218 and lookup logic 220. It will be recognized that functional blocks are shown and that the various operations may be combined or separated as desired. It will also be recognized that all the functional blocks are not needed in all implementations.

In operation, the hash table logic 204 when populating the hash table 202, receives a key (K) 222 and an associated value (V), from an application, service in the computing system, or other device for entry into the hash table 202. After the requested key is populated (i.e., inserted) in the hash table 202, the application or other entity may request the stored value back from the cache which uses the hash table 202 to retrieve the cached data. As such, a hash table lookup request 224 is received and lookup logic 220 processes the hash table entry request to retrieve the cached data based on the use of the hash table 202 as further described below.

Figure 3:
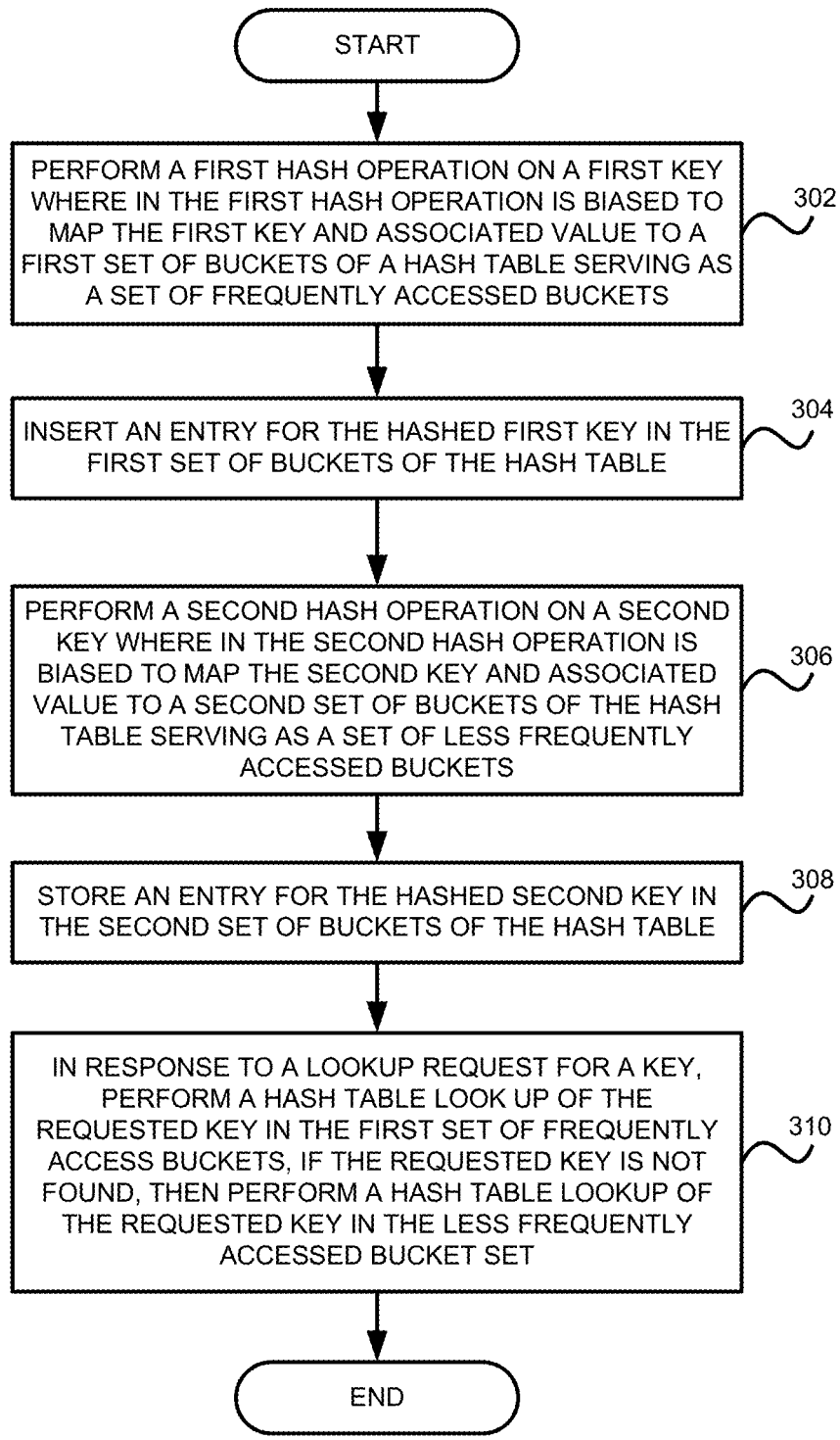
FIG. 3 is a flowchart illustrating one example of a method carried out by the portion of the computing system shown in FIG. 2.
Figure 4:
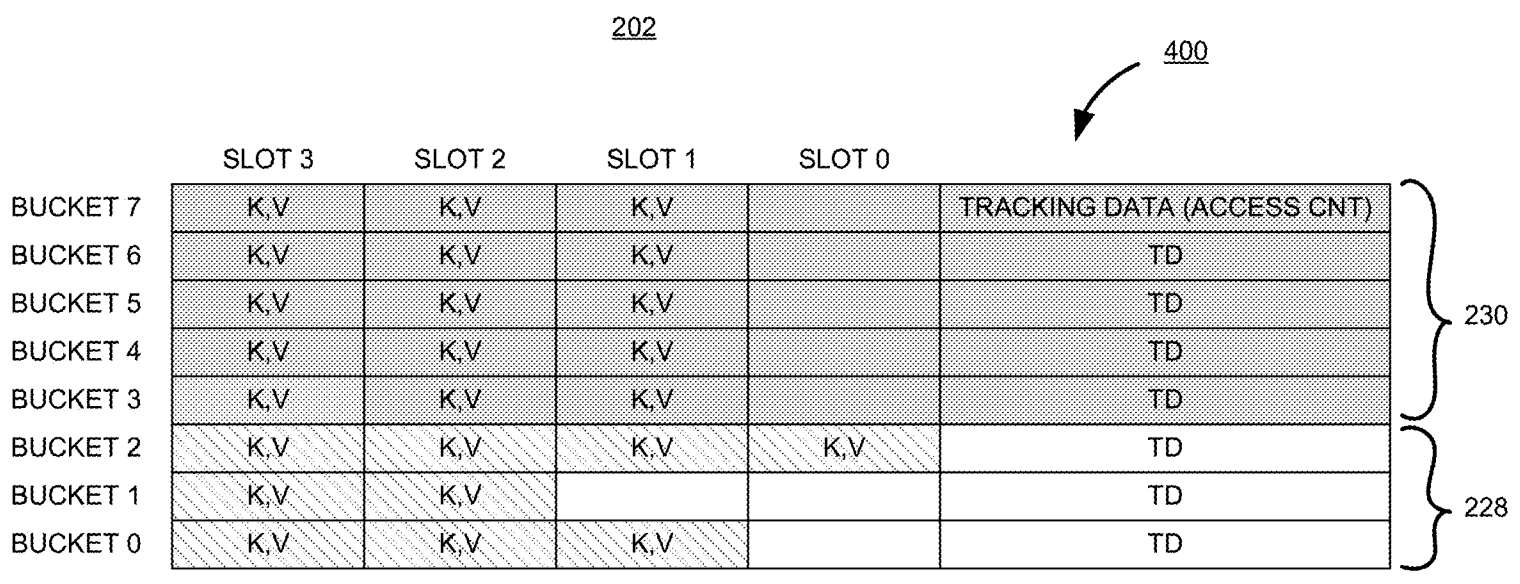

Referring also to FIGS. 3 and 4, a method 300 of operation is shown in connection with the block diagram of FIG. 2 as well as an example of a hash table 202 according to one example set forth herein. In some implementations, the hash generator 206 implements a hash function that maps exclusively to an infrequently-accessed (IA) set of buckets (bucket 3-bucket 7), also referred to as an IA bucket set, and hash generator 208 is a hash function that maps to just the frequently-accessed (FA) set of buckets (bucket 0-bucket 2), also referred to as an FA bucket set (see FIG. 4). Examples of these functions are represented below and use a similar nomenclature as shown in FIG. 1 but are different hash functions.

$$f1'(x) = \mod(f1(x), N) \text{ (where } x \text{ is the key)} \quad \text{Equation 1}$$

$$f2'(x) = N + \mod(f2(x), M) \quad \text{Equation 2}$$

Equation 1 illustrates an example of the hash function f1'(x) implemented by the hash generator 208 and Equation 2 represents the hash function operation f2'(x) provided by the hash generator 206. Unlike the system of FIG. 1, the system described herein employs the partitioning of buckets of the hash table into a frequently-accessed set of buckets (bucket 0-bucket 2) and an infrequently-accessed set of buckets (bucket 3-bucket 7) such that a first N buckets of the hash table correspond to the FA bucket set 228 and the remainder of the buckets M–N are partitioned for a less frequently-accessed bucket set 230, where M is the total number of buckets in the hash table. In some implementations, the FA bucket set is stored in the cache and the IA buckets are stored in the main memory or other memory.

Referring again to Equations 1 and 2, the modular operations can be implemented when N and M are powers of 2 or may be other than powers of 2. The hash generators 206 and 208 provide hash operations that are each respectively biased in such a way, for example, that the hash operation provided by the hash generator 208 is biased to map a key and an associated value to a set of buckets of the hash table that serve as a set of frequently-accessed buckets, FA bucket set 228, whereas the hash generator 206 performs a hash operation on the key and is biased to map the key and associated value to another and different set of buckets that are assigned as less frequently-accessed buckets 230, also referred to as IA bucket set 230. The hashed key generated by the hash generator 206 is shown as $H_{IA}(K)$ whereas the hashed key generated by the hash generator 208 is shown as $H_{FA}(K)$.

As shown in block 302, the method includes performing a hash operation on a key (K) 222 which has an associated value (V), wherein the hash operation is biased to map the key 222 and associated value to, in this example, a set of buckets of the hash table serving as a set of frequently-accessed buckets, FA bucket set 228. As such in this example, the control logic 212 sends a select control signal 232 to control the selector 210 to allow the key 222 to be passed to the hash generator 208. As shown in block 304, the hash generator 208 stores an entry for the key 222 in the set of FA buckets 228 corresponding to the frequently-accessed bucket set in the hash table. This may occur, for example, when the infrequently-accessed bucket set 230 is full. However, any other suitable criteria may also be used.

As shown in block 306, the method includes performing another hash operation on another key that is provided to the hash table logic 204, also referred to as key 222. The other hash operation is biased to map the key 222 and associated value to the other set of buckets of the hash table that serve as the less frequently-accessed bucket set 230. As such, the control logic 212 provides select control signal 232 to the selector 210 to provide the key 222 to the hash generator 206 which performs the hash operation on the key and stores, as shown in block 308, an entry for the hashed key in the IA bucket set 230 of the hash table. As shown in block 310, in response to a hash table lookup request 224 from an application or other service, to request a value from the hash table, the method includes performing a hash table lookup of the requested key in the frequently-accessed bucket set 228. As such, the lookup logic 220 causes the hash generator 208 to perform a hash on the received key that is part of the hash table lookup request 224, as shown by hash generation request 238, and the lookup logic 220 searches the frequently-accessed bucket set 228 for the hashed key. If the requested key is not found, then the lookup logic 220 requests, as shown by hash generation request 241, that the hash generator 206 generate a hash of the key which is then searched by the lookup logic 220 in the other bucket set, namely the infrequently-accessed bucket set 230. It will be recognized that the operations described herein may be done in any suitable order including in parallel or any other different order as desired. If the key was originally found in the frequently-accessed bucket set 228, then the lookup logic 220 retrieves the value 240 and provides a hash table reply 242 that includes the retrieved value 240 in response to the hash table lookup request 224. The hash table retrieval is performed for each lookup by the lookup logic 220 as needed.

As noted above with respect to Equations 1 and 2, the hash generators 206 and 208 are biased via the hash functions that are carried out by the respective hash generators. For example, one hash operation exclusively maps a key and associated value to a set of buckets of the hash table serving as a set of frequently-accessed buckets. Another of the hash generators is configured such that the hash operation exclusively maps a key and associated value to another set of buckets of the hash table that serve as a set of less frequently-accessed buckets.

Many different hash table insertion techniques may be employed. In some implementations, insertions into the hash table 202 are always performed to the infrequently-accessed bucket set 230 except when candidate infrequently-accessed buckets are full. When candidate IA buckets are full, cuckoo evictions are used to enable insertion into the IA bucket. In other implementations, the control logic 212 controls the selector 210 to insert into the FA bucket set 228 if a candidate IA bucket is full. In other implementations, a mix of both approaches are used based on heuristics such as a fullness of the overall table or IA buckets. In some examples, insertion into the FA buckets are performed when candidate buckets are full and an overall load on the IA bucket set 230 is higher than an overall load on the FA bucket set 228 by a set margin, otherwise cuckoo evictions are used to insert into the IA buckets.

In other implementations, insertions are done into both the IA bucket set 230 and the FA bucket set 228 under control of the control logic 212 on a statically or dynamically determined probability distribution basis. In some implementations, a random number generator is employed to determine for every insertion whether to switch the selector to have the hash generator 206 or the hash generator 208 perform the hash operation and placing of the hashed key and associated value in the FA bucket set 228 or the IA bucket set 230.

In another example, access tracking is performed. For example, tracking data 400 is produced by the lookup logic 220 or slot counting structure 214 that represents a number of times each slot in a bucket within the set of frequently-accessed buckets of the hash table and within the set of less frequently-accessed buckets of the hash table have been accessed. In one implementation, metadata is used as the tracking data 400 and is stored within the hash table 202. In other implementations, a slot access counter structure 214 such as slot counters, produce the tracking data 400. In this example, a counter is associated with each slot in the hash table to identify the access frequency of each slot. To reduce capacity overheads, a counter may be limited to a small number of bits such as two or three bits per counter and allowed to saturate instead of overflowing once the maximum value is reached. Data items such as slots whose access counters exceed a threshold are moved, in one example, to buckets in the frequently-accessed bucket set 228 from infrequently-accessed buckets in the IA bucket set 230. This may be done, for example, using frequently-accessed mapping functions. The mapping may be similar in some examples to a new insertion into the frequently-accessed bucket set, such as utilizing cuckoo evictions within the frequently-accessed set.

The counters in some implementations are reset periodically to ensure only items that are accessed frequently enough to reach the threshold between counter resets is identified as frequently-accessed. In other implementations, items that are no longer frequently-accessed are remapped back to the infrequently-accessed bucket set. If too many or not enough slots are identified as frequently-accessed, which manifests as a large disparity in the occupancies between the FA bucket set and the IA bucket sets, either a threshold or a counter reset frequency is altered to shift the criteria for being considered frequently-accessed. This may be performed by the lookup logic 220. Where a counter structure is used, another data structure may be treated as a hardware- or software-managed cache, where only the counters for the frequently-accessed subset of items is retained. Any item that is not accessed frequently enough for its counter to remain in the counter cache may be considered infrequently-accessed. However, any suitable counting mechanism may be employed.

For data sets whose accessed behavior does not change quickly over time, access frequency tracking only needs to be performed periodically and need not be performed all at once. Once sufficient profile information has been collected, further access tracking can be suspended to avoid the performance overhead of such tracking. In other examples, access tracking is only performed probabilistically, where the tracking overhead is only occurred on a small fraction of lookups.

In certain implementations, during lookups, items are always looked up using the frequently-accessed mapping function first. If the item is not found in the FA candidate bucket, the IA mapping function is used to lookup in the IA bucket set. Although this can increase the number of cache accesses compared to prior systems, for elements in the IA buckets (e.g., due to first checking the FA buckets), the methodology can reduce the number of main memory accesses for data sets where most lookups are to a small subset (e.g., some forms of social network data). Also as illustrated above, two mapping hash functions are employed, however any suitable number may be employed. For example, two IA mapping functions can be employed, and one FA mapping function can be employed, or any suitable number of hash functions can be employed.

In other implementations, a different lookup approach can be employed such as for memory reads for the IA buckets to be issued in parallel with the lookup of the FA buckets so that the memory access latency of IA buckets is overlapped with checking the FA buckets. This can improve latency over other implementations.

The hash table bucket fullness determinator 216 determines on a per-bucket level which buckets are full, and in another example, on a per-bucket set level and/or determines which bucket set is full. The control logic 212 informs the bucket mover 218 to evict hash table entries, for example, when the IA buckets are full and then stores the entry in the second set of buckets. The hash table bucket fullness determinator 216 provides bucket fullness data 250 to the control logic indicating which buckets are full and/or whether a bucket set is full. It will be recognized that the functional blocks described can be combined or otherwise varied with other functional blocks as desired.

Figure 5:
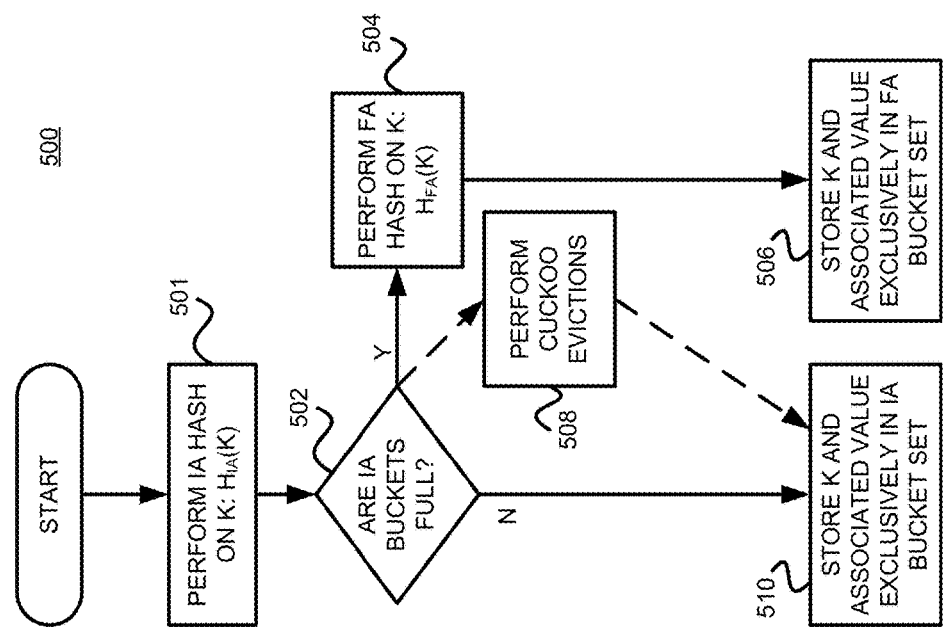
FIG. 5 is a flowchart illustrating one example of a method for inserting a hash table entry in a hash table in accordance with one example set forth in the disclosure.

FIG. 5 is a flowchart illustrating one example of a method 500 for inserting a hash table entry in a hash table. It will be recognized that the operations described can be performed in any suitable order and that other operations may be employed as desired. In this example, hash table insertions are performed to the infrequently-accessed set first, except when the candidate infrequently-accessed bucket is full. When a candidate infrequently-accessed bucket is full, cuckoo evictions are used to enable insertion into the infrequently-accessed bucket. In other implementations, insertion into the frequently-accessed bucket set is performed if the candidate infrequently-accessed bucket is full. A mix of both approaches may also be used based on heuristics such as the fullness of the overall hash table or the IA buckets. For example, in some implementations, insertion is performed into the frequently-accessed buckets when candidate buckets are full and an overall load on the infrequently-accessed buckets is higher than the overall load on the frequently-accessed buckets by some margins, otherwise cuckoo evictions are performed to insert into the IA buckets.

As shown in block 501, the method includes performing a hash operation on the key that is biased to map the key and associated value to a set of buckets in the hash table serving as a set of less frequently-accessed buckets. As shown in block 502, the method includes determining if the candidate infrequently-accessed buckets are full. In one example, the bucket fullness data 250 is used by control logic 212 to determine whether to move hash table entries between the IA bucket set 230 and the FA bucket set 228 of the hash table 202. For example, the hash table bucket fullness determinator 216 tracks each of the buckets 3-7 in the IA bucket set 230. If the candidate buckets in the IA bucket set 230 are full, the method continues to block 504, in one example, where the control logic 212 causes the hash generator 208 to perform a frequently-accessed hash on the key and the hash generator 208 stores the key and the associated value exclusively in the frequently-accessed bucket set 228 as shown in block 506. In other embodiments, as shown in block 508, if the candidate buckets in the infrequently-accessed bucket set 230 are full but the entire infrequently-accessed bucket set is not full, the control logic 212 performs cuckoo evictions in the IA bucket set 230. Alternatively, when all buckets of infrequently-accessed buckets are full (not shown in FIG. 5), the control logic 212 causes bucket mover 218 to move one or more entries from the IA bucket set 230 to the frequently-accessed bucket set 228. As such, evicting hash table entries when the less frequently-accessed buckets are full and then storing the entry for the hashed key in the second set of buckets is performed.

As shown in block 510, the method includes storing the entry for the hashed key and associated value in the buckets of the hash table serving as a less frequently-accessed buckets, potentially after performing an eviction of hash table entries when the candidate IA buckets of the hash table are full.

As such, during lookups, in certain implementations, entries are always looked up using the frequently-accessed mapping function first. If the entry is not found in the FA candidate bucket(s), the IA mapping function(s) are used to lookup the IA buckets. Although this can increase the number of cache accesses compared to certain prior art hash table lookup methods, the operation can reduce the number of main memory accesses for data sets where most lookups are to a subset of the keys and values in the hash table.

Figures 6, 8:
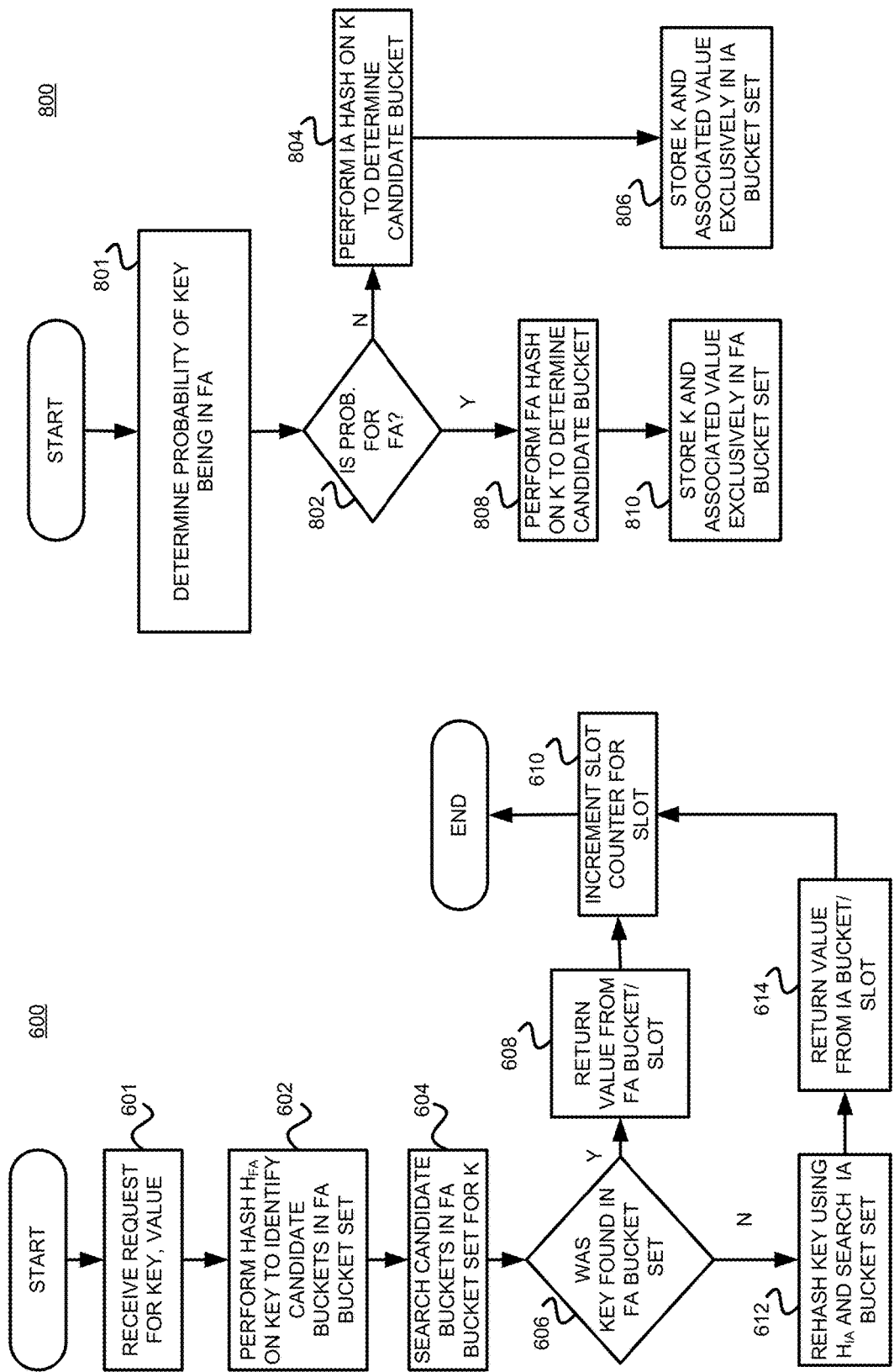
FIG. 6 is a flowchart illustrating one example of a method for looking up a hash table entry in accordance with one example set forth in the disclosure.
FIG. 8 is a flowchart illustrating one example of a method for storing hash table entries in accordance with one example set forth in the disclosure.

FIG. 6 is a flowchart illustrating one example of a method 600 for looking up a hash table entry. The hash table logic 204 receives a hash table lookup request 224 as shown in block 601. As shown in block 602, the hash table logic 204 performs a hash operation on the key (K) 222 using the hash generator 208 which corresponds to the hash used for the frequently-accessed bucket set 228 to identify candidate buckets in the FA bucket set 228. As such, when performing a hash table lookup, the FA bucket set 228 is searched before the IA bucket set 230. For example, in response to the hash table lookup request 224, the lookup logic 220 uses the key received in the hash table lookup request 224 and provides a hash generation request 238 to the hash generator 208 to perform a hash operation on the key. As shown in block 604, the lookup logic 220 searches the candidate buckets of the FA bucket set 228 for the key K. The hash function identifies the candidate bucket to search in. Once that bucket is identified, the bucket is searched for the original key. As shown in block 606, if the key K was found in the FA bucket set 228, the method continues to block 608 where the value corresponding to the key is returned from the candidate bucket in the FA bucket set 228 from the appropriate slot. As shown in block 610, the slot counters are incremented for the slot that was accessed.

Returning back to block 606 and as shown in block 612, if the key was not found in the FA bucket set, the key is rehashed to produce hashed key ($H_{IA}(K)$) to identify candidate buckets, using the hash generator 206 to perform a hash operation associated with the infrequently-accessed buckets and searching the infrequently-accessed bucket set 230. In one example, this is controlled by the lookup logic 220 sending a hash generation request 241 to the hash generator 206 and having the lookup logic 220 perform a look up in the identified candidate buckets of the IA bucket set 230. As shown in block 614, the lookup logic 220 returns the value from the IA candidate bucket and corresponding slot via the hash table reply 242. As shown in block 610, the slot counter is incremented. If the rehashed key is not found in the IA bucket set 230, a hash table reply 242 indicates to the requesting entity that the key was not found. Otherwise, the value is returned to the requesting entity via the hash table reply 242. In some implementations, simultaneous lookups are performed, and the value is returned from whichever lookup found a hit.

Figure 7:
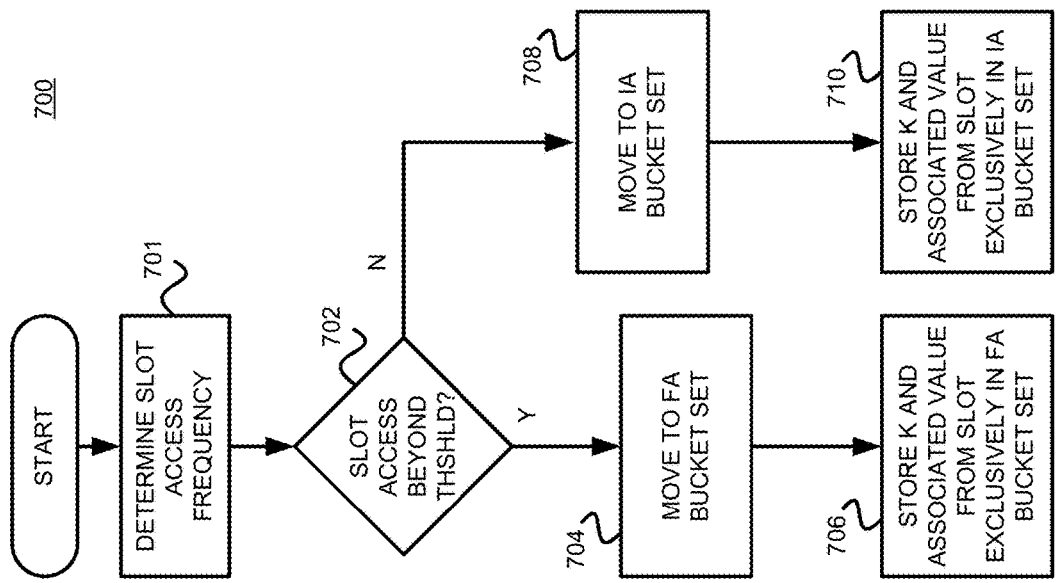
FIG. 7 is a flowchart illustrating one example of a method for moving hash table entries in accordance with one example set forth in the disclosure.

FIG. 7 is a flowchart illustrating an example of a method 700 for moving hash table entries. As shown in block 701, the control logic 212 determines a slot access frequency. This is done by the control logic 212 evaluating the slot counters to determine slot counts for each of the slots in the hash table 202. As shown in block 702, the slot access count, for example, is compared to a threshold value by the control logic. If the slot access count is beyond the threshold, the hash table logic 204 moves entries to the frequently-accessed bucket set 228 using the hash generator 208. In some implementations, this move is only done for items in the IA bucket set whose access count is over the threshold. There is no need to move an item if it is already in the FA set. As such, the control logic 212 informs the bucket mover 218, for example, to remove the entry from the IA bucket set and the control logic causes the hash generator 208 to employ the hash operation that exclusively maps to the FA bucket set. This is shown in block 704. For example, the system uses a copy of the key from the slot or representation thereof which is used by the other hash function namely the frequently-accessed hash function that is used by the hash generator 208. As shown in block 706, the method includes storing the key and associated value from the slot exclusively in the FA bucket set 228. If desired, cuckoo evictions can also be used within the FA bucket set if needed. As shown in block 708, if the slot access is not beyond a threshold, meaning that the slot is not considered to be frequently-accessed, the entry is moved to the IA bucket set using the hash generator 206. For example, this is done if the item is in the FA bucket set but the access count is below the threshold. The control logic 212 informs the bucket mover 218 to move an entry from one bucket set to another bucket set. This may be done, for example, where the slot in a FA bucket set has not been accessed sufficiently frequently once it has been moved in the FA bucket set 228. As shown in block 710, the method includes storing the key and associated value from the slot exclusively in the IA bucket set 230.

FIG. 8 is a flowchart illustrating one example of a method 800 for inserting a hash table entry in a hash table. Performing the hash operation corresponding to the frequently-accessed bucket set and performing the hash operation corresponding to the IA bucket set is done on a weighted basis in response to a table entry insertion request. For example, as shown in block 801, the control logic 212 in response to receiving a table entry insertion request, determines a probability of a received key (K) 222 being in the FA bucket set. For example, the control logic 212 may have a prestored weighting factor associated with each hash mapping operation such that in one example, a 10% probability is given that the key should be placed in the FA bucket set 228 and a 90% probability that the key should be placed in the IA bucket set 230. As such, 90% of the keys received for insertion are placed in the IA bucket set using the hash generator 206 and 10% are placed in the FA bucket set 228 using the hash generator 208. As shown in block 802, the control logic 212 determines if the probability is in favor of placing the key in the FA bucket set 228. If not, as shown in block 804, the infrequently-accessed hash is performed by the hash generator 206 on the key to determine the candidate bucket. As shown in block 806, the hash table logic 204 stores the key and associated value exclusively in the IA bucket set 230. However, if the control logic 212 determines that the probability is to place the received key in the FA bucket set 228, as shown in block 808, the frequently-accessed hash operation is employed using the hash generator 208 on the key to determine the candidate bucket and, as shown in block 810, the hash table logic 204 stores the key and associated value exclusively in the FA bucket set 228. Any suitable probability determination can be used including the use of a random number generator to equate to a 50% probability, or any other predefined probabilities may be employed as desired.

It has been found that the invention as described works well for data structures where the frequently-accessed data set is stable over a long period of time. In cases where that set changes frequently, it is possible to aggressively migrate items in the FA buckets to the IA buckets that have not been accessed recently. This can either be done proactively by periodically migrating such items back to IA buckets, or on-demand as new items are moved into FA buckets and space needs to be freed up. Items that have not been accessed frequently in the recent past can be determined based on the access tracking data.

Some implementations herein are presented in the context of FA buckets being the first N buckets and the latter (M–N) buckets as the IA buckets. Alternative partitioning approaches are envisioned and covered by the invention. These alternatives include approaches for using any contiguous N buckets as the FA buckets and the remainder as IA buckets, as well as approaches where a non-contiguous set of N buckets are used as FA buckets and the remainder are used as IA buckets. Similarly, the requirement on the FA mapping function(s) is that they map to the appropriate N buckets (i.e., the FA buckets) and are not limited to the specific embodiments described above.

Further, the implementations described above discuss the case where FA mapping functions map exclusively to the FA buckets and IA mapping functions map exclusively to the IA buckets. However, alternative embodiments are envisioned where FA mapping functions map to FA buckets with higher probability than to IA buckets (but not exclusively) and IA mapping functions map to IA buckets with higher probability than FA buckets (but not exclusively).

Also, in some implementations, if tracking data is used, the tracking data can be in the context of absolute counts associated with data items. However, alternative embodiments are envisioned where the frequency tracking is done via approximate data structures such as Bloom Filters. For example, the item's key may be marked as accessed in a Bloom Filter when it is accessed for the first time and, on a subsequent access, if the item is already found in the Bloom Filter, the item may be considered frequently-accessed. While this may result in false positives, that is acceptable as this is a performance optimization and will not affect correctness. In this variant, the Bloom Filter may be reset periodically to ensure only repeated accesses within a known and bounded time interval are considered frequent accesses. Alternatively, more sophisticated approximate set membership tracking structures, such as Counting Bloom Filters, may be used to keep an approximate count of accesses (and not just the fact the item was accessed at least once before) and enforce a threshold number of accesses above which an item is considered frequently-accessed.

The access tracking data may be provided by using other forms of algorithms for determining repeated items. For example, there exist prior art techniques that can provide an approximation of the most frequently seen items within a sequence of items (e.g., the sequence of items accessed, in the case of this invention). Such approaches may also be used to periodically identify the most frequently-accessed items in the recent past and remap them to the FA buckets.

It will be recognized that the placement of an item in the IA bucket set or the FA bucket set is a performance optimization and does not affect correctness. Therefore, any given implementations may treat any of the optimizations discussed herein as best-effort. For example, if moving a data item identified as frequently-accessed into the FA set incurs cuckoo evictions, the implementation may decide not to perform that movement to avoid the overhead of the evictions. Alternatively, such a movement may invoke cuckoo evictions, but may terminate the eviction chain at some threshold number of evictions by moving an element to the IA set even if that element is frequently-accessed.

In some implementations, the invention is described in the context of hash tables with cuckoo hashing as an example starting point. However, the invention is applicable to any hash table where multiple mapping functions are supported. Further, the invention is also applicable to other data structures that rely on mapping a data item to a set of buckets using one or more deterministic functions, such as hash maps and other set membership data structures, including approximate set membership data structures.

Figure 9:
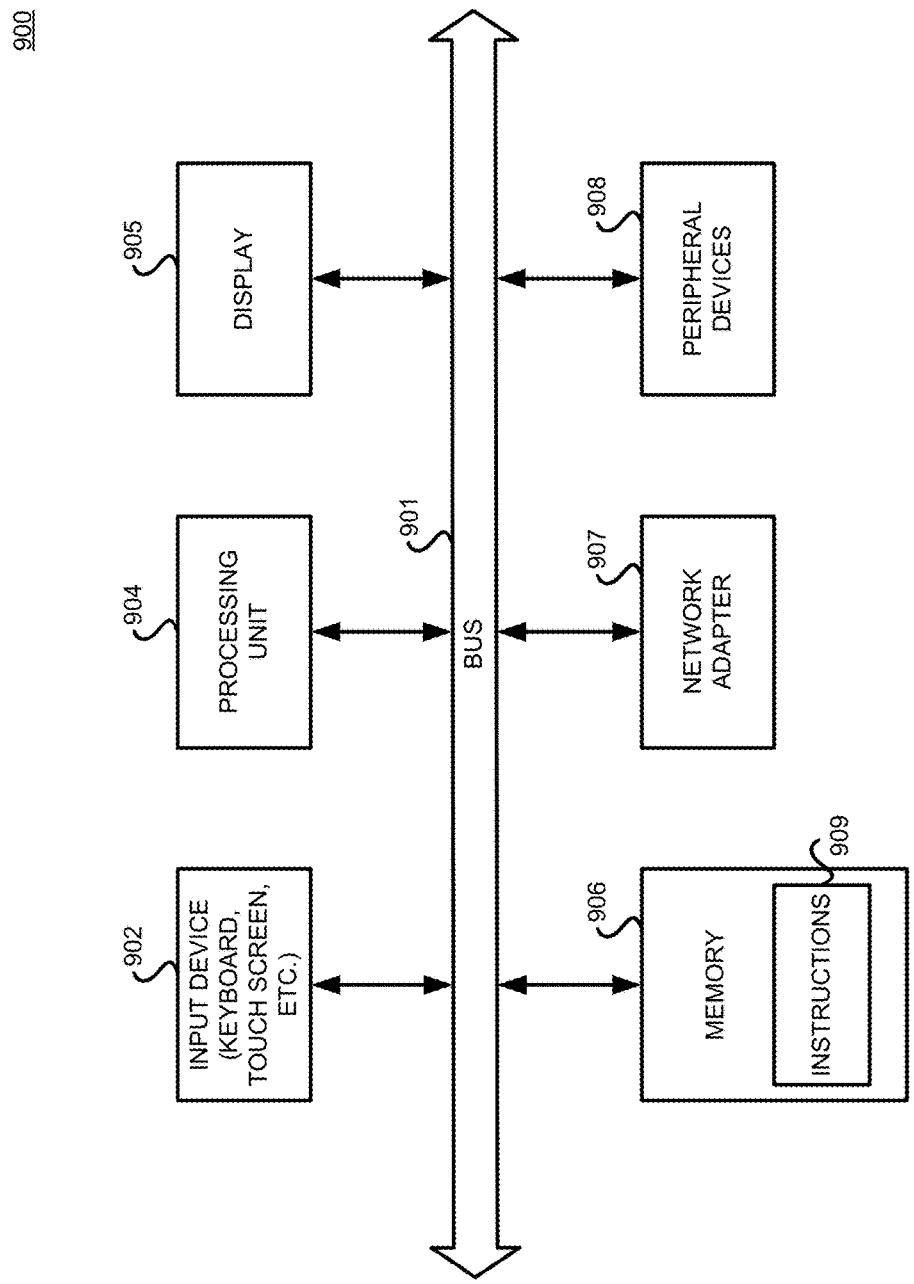
FIG. 9 is a block diagram illustrating one example of a computing system in accordance with one example set forth in the disclosure.

FIG. 9 illustrates an embodiment of a computing system 900 that uses a hash table with a FA bucket set and an IA bucket set. In general, the computing system 900 is embodied as any of a number of different types of devices, including but not limited to a laptop or desktop computer, mobile device, server, network switch or router, system on chip, integrated circuit, multipackage device etc. In this example, the computing system 900 includes a number of components 902-908 that communicate with each other through a bus 901. In computing system 900, each of the components 902-908 is capable of communicating with any of the other components 902-908 either directly through the bus 901, or via one or more of the other components 902-908. The components 902-908 in computing system 900 are contained within a single physical enclosure, such as a laptop or desktop chassis, or a mobile phone casing or in some implementations are a system on chip or other configuration. In alternative embodiments, some of the components of computing system 900 are embodied as peripheral devices such that the entire computing system 900 does not reside within a single physical enclosure.

In some implementations, the computing system 900 also includes user interface devices for receiving information from or providing information to a user. Specifically, the computing system 900 includes an input device 902, such as a keyboard, mouse, touch-screen, or other device for receiving information from the user. The computing system 900 displays information to the user via a display 905, such as a monitor, light-emitting diode (LED) display, liquid crystal display, or other output device. However, such devices need not be employed.

In certain implementations, computing system 900 additionally includes a network adapter 907 for transmitting and receiving data over a wired or wireless network. Computing system 900 also includes one or more peripheral devices 908. The peripheral devices 908 may include mass storage devices, location detection devices, sensors, input devices, or other types of devices used by the computing system 900.

Computing system 900 includes a processing unit 904. The processing unit 904 receives and executes instructions 909 that are stored in a memory system 906. In one embodiment, the processing unit 904 includes multiple processing cores that reside on a common integrated circuit substrate. Memory system 906 includes memory devices used by the computing system 900, such as random-access memory (RAM) modules, read-only memory (ROM) modules, hard disks, and other non-transitory computer-readable media. Some of the memory devices are used as memory 200 for the processing unit 904.

In certain embodiments, a non-transitory storage medium, such as memory 906, includes executable instructions that when executed by one or more processors, such as processing unit 904, causes the one or more processors to perform a hash operation on a key wherein the hash operation is exclusively configured or biased to map the key and its associated value to a set of buckets of a hash table serving as a set of frequently-accessed buckets, also referenced as the FA bucket set. In some implementations, the FA bucket set of the hash table is sized to fit in a cache. In some implementations, the storage medium includes executable instructions that when executed by one or more processors, causes the one or more processors to store an entry for the hashed key in the FA bucket set in the hash table. In certain implementations, the storage medium includes executable instructions that when executed by one or more processors, causes the one or more processors to perform a different hash operation on a key, which can be the same or different key, where the hash operation is biased to map the key and associated value to a set of buckets of the hash table serving as a set of less frequently-accessed buckets, also referenced as the IA bucket set and store an entry for the hashed key in the IA bucket set of the hash table. In response to a lookup request for a key, the one or more processors perform a hash table look up of the requested key in the frequently access bucket set, if the requested key is not found, then performs a hash table lookup of the requested key in the less frequently-accessed bucket set.

In some implementations, the non-transitory storage medium stores executable instructions that when executed by one or more processors, causes the one or more processors to bias the hash operations so that one of the first hash operations exclusively maps the key and associated value to frequently-accessed bucket set and another of the hash operations to map a key and associated value to the less frequently-accessed bucket set. In some implementations, the storage medium stores executable instructions that cause one or more processors to operate as described with reference to FIGS. 2-8.

Some embodiments of computing system 900 may include fewer or more components than the embodiment as illustrated in FIG. 9. For example, certain embodiments are implemented without any display 905 or input devices 902. Other embodiments have more than one of a particular component; for example, an embodiment of computing system 900 could have multiple processing units 904, buses 901, network adapters 907, memory systems 906, etc.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method, carried out by one or more processors, comprising:
   performing a first hash operation on a first key, wherein the first hash operation is biased to map the first key and an associated value to a first candidate bucket within a first set of buckets of a hash table serving as a set of frequently-accessed buckets;
   storing an entry for the first key and associated value in the first candidate bucket within the first set of buckets of the hash table;
   performing a second hash operation on a second key, wherein the second hash operation is biased to map the second key and an associated value to a second candidate bucket within a second set of buckets of the hash table serving as a set of less frequently-accessed buckets, wherein the first and second hash operations are performed on a weighted basis in response to table entry insertion requests;
   storing an entry for the second key and associated value in the second candidate bucket within the second set of buckets of the hash table;
   in response to a lookup request for a key, performing a first hash table look up of the requested key in the first set of buckets of the hash table;
   in response to the requested key not being found in the first set of buckets of the hash table, performing a second hash table lookup of the requested key in the second set of buckets of the hash table; and
   moving at least one entry between buckets based on tracking data wherein the tracking data represents a number of times each slot in the first set of buckets of the hash table serving as the set of frequently-accessed buckets and a number of times each slot in the second set of buckets of the hash table serving as the set of less frequently-accessed buckets have been accessed.

2. The method of claim 1, further comprising biasing the first and second hash operations so that the first hash operation is exclusively configured to map the first key and associated value to the first set of buckets of the hash table serving as the set of frequently-accessed buckets and so that the second hash operation is exclusively configured to map the second key and associated value to the second set of buckets of the hash table serving as the set of less frequently-accessed buckets.

3. The method of claim 1, further comprising:
   before storing the entry for the second key and associated value in the second set of buckets, evicting one or more entries from the second set of buckets of the hash table serving as the set of less frequently-accessed buckets and inserting the one or more entries into the first set of buckets of the hash table serving as the set of frequently-accessed buckets when the second set of buckets of the hash table is full.

4. The method of claim 1, wherein storing the entry for the second key and associated value in the second set of buckets of the hash table serving as the set of less frequently-accessed buckets is made prior to storing the entry of the first key and associated value in the first set of buckets of the hash table serving as the set of frequently-accessed buckets except when the second set of buckets is full.

5. The method of claim 1 comprising: storing and using per bucket fullness data to determine whether to move entries between the first and second sets of buckets of the hash table; and
   moving at least entry between the first and second sets of buckets of the hash table based on the per bucket fullness data.

6. A computing device, comprising:
   a memory including a hash table:
   one or more processors configured to:
      perform a first hash operation on a first key, wherein the first hash operation is biased to map the first key and an associated value to a first candidate bucket within a first set of buckets of the hash table serving as a set of frequently-accessed buckets;
      store an entry for the first key and associated value in the first candidate bucket within the first set of buckets of the hash table;
      perform a second hash operation on a second key, wherein the second hash operation is biased to map the second key and an associated value to a second candidate bucket within a second set of buckets of the hash table serving as a set of less frequently-accessed buckets, wherein the first and second hash operations are performed on a weighted basis in response to table entry insertion requests;

store an entry for the second key and associated value in the second candidate bucket within the second set of buckets of the hash table;

in response to a lookup request for a key, perform a first hash table look up of the requested key in the first set of buckets of the hash table;

in response to the requested key not being found, perform a second hash table lookup of the requested key in the second set of buckets of the hash table; and move at least one entry between buckets based on tracking data wherein the tracking data represents a number of times each slot in the first set of buckets of the hash table serving as the set of frequently-accessed buckets and a number of times each slot in the second set of buckets of the hash table serving as the set of less frequently-accessed buckets have been accessed.

7. The computing device of claim 6, wherein the one or more processors are further configured to bias the first and second hash operations so that the first hash operation is exclusively configured to map the first key and associated value to the first set of buckets of the hash table serving as the set of frequently-accessed buckets and so that the second hash operation is exclusively configured to map the second key and associated value to the second set of buckets of the hash table serving as the set of less frequently-accessed buckets.

8. The computing device of claim 6, wherein the one or more processors are further configured to:

before storing the entry for the second key and associated value in the second set of buckets, evict one or more entries from the second set of buckets of the hash table serving as the set of less frequently-accessed buckets and insert the one or more entries into the first set of buckets of the hash table serving as the set of frequently-accessed buckets when the second set of buckets of the hash table is full.

9. The computing device of claim 6, wherein the memory comprises a cache memory that stores the first set of buckets of the hash table and another memory that stores the second set of buckets of the hash table.

10. The computing device of claim 6, wherein the one or more processors are configured to store the entry for the second key and associated value in the second set of buckets of the hash table serving as the set of less frequently-accessed buckets is made prior to storing the entry of the first key and associated value in the first set of buckets of the hash table serving as the set of frequently-accessed buckets except when the second set of buckets is full.

11. The computing device of claim 6, wherein the one or more processors are configured to:

store and use per bucket fullness data to determine whether to move entries between the first and second sets of buckets of the hash table; and move at least one entry between the first and second sets of buckets of the hash table based on the per bucket fullness data.

12. A non-transitory storage medium comprising executable instructions that when executed by one or more processors, causes the one or more processors to:

perform a first hash operation on a first key, wherein the first hash operation is biased to map the first key and an associated value to a first candidate bucket within a first set of buckets of a hash table serving as a set of frequently-accessed buckets;

store an entry for the first key and associated value in the first candidate bucket within the first set of buckets of the hash table;

perform a second hash operation on a second key, wherein the second hash operation is biased to map the second key and an associated value to a second candidate bucket within a second set of buckets of the hash table serving as a set of less frequently-accessed buckets, wherein the first and second hash operations are performed on a weighted basis in response to table entry insertion requests;

store an entry for the second key and associated value in the second candidate bucket within the second set of buckets of the hash table;

in response to a lookup request for a key, perform a first hash table look up of the requested key in the first set of buckets;

in response to the requested key not being found, perform a second hash table lookup of the requested key in the second set of buckets of the hash table; and move at least one entry between buckets based on tracking data wherein the tracking data represents a number of times each slot in the first set of buckets of the hash table serving as the set of frequently-accessed buckets and a number of times each slot in the second set of buckets of the hash table serving as the set of less frequently-accessed buckets have been accessed.

13. The non-transitory storage medium of claim 12, further comprising executable instructions that when executed by one or more processors, causes the one or more processors to bias the first and second hash operations so that the first hash operation is exclusively configured to map the first key and associated value to the first set of buckets of the hash table serving as the set of frequently-accessed buckets and so that the second hash operation is exclusively configured to map the second key and associated value to the second set of buckets of the hash table serving as the set of less frequently-accessed buckets.

14. The non-transitory storage medium of claim 12, further comprising executable instructions that when executed by one or more processors, causes the one or more processors to:

before storing the entry for the second key and associated value in the second set of buckets, evict one or more entries from the second set of buckets of the hash table serving as the set of less frequently-accessed buckets and insert the one or more entries into the first set of buckets of the hash table serving as the set of frequently-accessed buckets when the second set of buckets of the hash table is full.

* * * * *